Feb. 22, 1927.
L. DE FOREST
RECORDING SOUND
Original Filed July 16, 1921
1,618,641
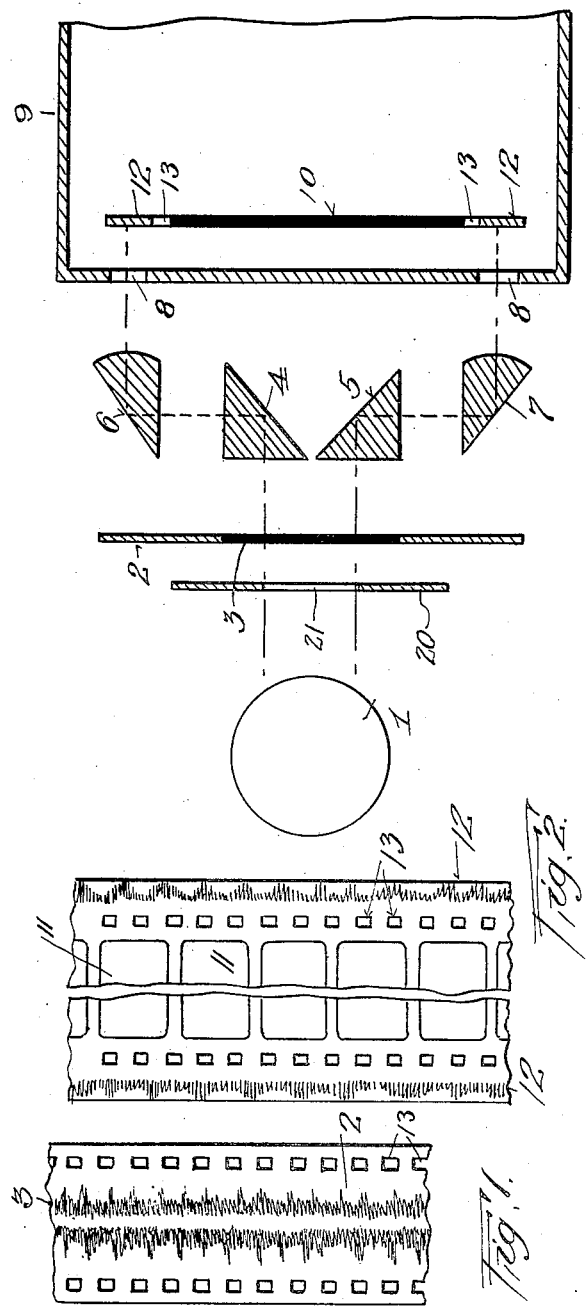

Patented Feb. 22, 1927.

1,618,641

UNITED STATES PATENT OFFICE.

LEE DE FOREST, OF NEW YORK, N. Y., ASSIGNOR, BY MESNE ASSIGNMENTS, TO DE FOREST PHONOFILM CORPORATION, OF JERSEY CITY, NEW JERSEY, A CORPORATION OF DELAWARE.

RECORDING SOUND.

Original application filed July 16, 1921, Serial No. 485,332. Divided and this application filed October 28, 1922. Serial No. 597,512.

This invention relates generically to the art of recording sound and more specifically where such record is obtained photographically for use in connection with photographic sound records such as films or the like, and is especially adaptable for use in connection with the art of motion picture photography, and is a division of my Patent Number 1,489,314, of April 8, 1924.

The object of the invention is to provide means which are simple, economical and efficient for photographing sound record on films.

A further object of the invention is to provide means which are highly effective for accurately recording sounds on the marginal edges of a standard motion picture film.

Further objects of the invention will appear more fully hereinafter.

The invention consists substantially in the construction, combination, location and relative arrangement of parts and the method employed in connection therewith, all as will be more fully hereinafter set forth, as shown by the accompanying drawing and finally pointed out in the appended claims.

Figure 1 is a fragmentary view of a sound record embodying the principles of my invention.

Fig. 2 is a similar view showing the sound record applied to the marginal edge of the motion picture film in accordance with my invention.

Fig. 3 is a diagrammatic view illustrating the principle involved in recording the sound waves photographically, in accordance with my invention, on the marginal edge of a standard motion picture film.

The same part is designated by the same reference character wherever it occurs throughout the several views.

I find that if the original photographs of such sound-controlled light fluctuations be made large so that the width of the maximum amplitude of such photographic track be, say one-half inch or more, a more exact and faithful photograph containing any details of the finest light variations produced by sound waves will be obtained. For use as a sound record per se this type of record is satisfactory, but as is readily apparent it would be too large a record to use in connection with a motion picture film unless used independently therefrom and therefore necessitating the various problems of synchronism which have always been considered, and still are considered to be the objectionable problems in this art. In accordance with my invention, however, I produce the large, accurate and definite sound record on a film, for example, as shown in Fig. 1, and therewith reduce photographically the record thus obtained and print the same on both marginal edges of the motion picture film as shown in Fig. 2.

In the production of the photographic sound record of Fig. 1 it will be observed that the record is approximately symmetrical on both sides of the axis thereof and it will readily be apparent that a highly effective and efficient record can be obtained by photographing the record contained on opposite sides of the axis thereof, on the marginal edges. This is accomplished, in accordance with my invention, in the manner illustrated in Fig. 3, wherein the sound record film 2 containing thereon the sound record 3 is passed between a light source 1 and prisms 4 and 5 so arranged that the sound record on one side of the axis of the film 2 is reflected in one direction and the record on the other side of the film is reflected in the opposite direction by means of the prisms 4 and 5 respectively. A screen 20 having the slit 21 is placed between the light source 1 and the film 2. It will, of course, be understood that it is the light rays affected by the sound record 3 that are reflected by the respective prisms 4 and 5. The reflected light rays are again reflected by prisms 6 and 7 to direct the same in parallel lines through orifices 8 in the casing 9, in which the motion picture film 10, either exposed as to the picture spacing 11 thereof and unexposed as to the marginal edge thereof or unexposed as to its entire surface, is located. Means are provided to reduce, in size, the sound record 3 contained on its film 2, to the necessary size to be accurately and completely recorded on the marginal edges 12 of the film 10. This means may comprise suitable lenses or preferably a combination of a convex lens with the prisms 6 and 7, as shown. By means of this arrangement it will readily be apparent to those skilled in the art that the large, clear, distinct sound record 3 contained on its film 2 may be accurately reproduced in smaller, but nevertheless complete detail on the marginal edges 12 of the motion picture film, to thereby enable utilization of the space of the film contained between the intermediate feed perforations 13, and the edge or edges thereof.

It will also be readily apparent to those skilled in the art that by suitable location of the prisms 4, 5, 6, 7, and the orifices 8 of the casing 9, the reproduction of the sound record may be effected on any other desired part of the film. By suitable variation in the form of the prisms 6 and 7, or the utilization of suitable lenses, the original sound record may be reduced in size, reproduced as of the same size or enlarged, as desired.

Many other modifications and changes in details will occur to those skilled in the art without departing from the spirit and scope of my invention as defined in the claims, but having now set forth the objects and nature of my invention, and having shown and described structures embodying the principles thereof and illustrating the method employed in accordance therewith, what I claim as new and useful, and of my own invention, and desire to secure by Letters Patent, is,—

1. The method of producing talking moving pictures on the same film which comprises photographing simultaneously upon separate films the picture and the sound, leaving a portion of the picture film unexposed, dividing the sound record through the axis thereof, and re-photographing the divisional portions thereof on the picture record at the unexposed portion.

2. The method of producing talking moving pictures on the same film which comprises photographing simultaneously upon separate films the picture and the sound and re-photographing different portions of the sound record on the picture record at a plurality of points.

3. The method of producing talking moving pictures on the same film which comprises photographing simultaneously upon separate films the picture and the sound and re-photographing different portions of the sound record on an unexposed portion of the picture record at the marginal edges of said film.

4. The method of producing talking moving pictures on the same film which comprises photographing simultaneously upon separate films the picture and the sound and re-photographing different portions of the sound record on the marginal edges of the picture record.

5. The method of producing talking moving pictures on the same film which comprises photographing simultaneously upon separate films the picture and the sound, dividing the sound record through the axis thereof and re-photographing the divisional portions thereof on opposite sides of the picture record on the picture record film.

In testimony whereof I have hereunto set my hand on this 24th day of October, A. D. 1922.

LEE DE FOREST.